United States Patent [19]

Schmitt, Jr. et al.

[11] 4,032,435

[45] June 28, 1977

[54] HYDRODESULFURIZATION OF PETROLEUM RESIDUUM UTILIZING A CARBON-SUPPORTED CATALYST

[75] Inventors: Joseph Lawrence Schmitt, Jr., Bethel; George Augustus Castellion, Stamford, both of Conn.

[73] Assignee: American Cyanamid Company, Stamford, Conn.

[22] Filed: Sept. 22, 1976

[21] Appl. No.: 725,599

Related U.S. Application Data

[60] Division of Ser. No. 540,936, Jan. 14, 1975, Pat. No. 3,997,473, which is a continuation-in-part of Ser. No. 408,356, Oct. 23, 1973, abandoned.

[52] U.S. Cl. .................................................. 208/216
[51] Int. Cl.² ........................................ C10G 23/02
[58] Field of Search ............ 208/216, 215; 252/439

[56] References Cited

UNITED STATES PATENTS

| 3,477,963 | 11/1969 | van Venrooy | 208/215 |
| 3,715,303 | 2/1973 | Wennerberg et al. | 208/216 |
| 3,725,303 | 4/1973 | Urban et al. | 252/439 |
| 3,812,028 | 5/1974 | Wennerberg et al. | 208/216 |
| 3,997,473 | 12/1976 | Schmitt, Jr. et al. | 208/216 |

*Primary Examiner*—George Crasanakis
*Attorney, Agent, or Firm*—William J. van Loo

[57] ABSTRACT

A hydrodesulfurization catalyst consisting essentially of a carbon support carrying thereon at least 10 and up to 20 weight percent of a first metal selected from tungsten and molybdenum and from about 2 to 10 weight percent of a second metal selected from cobalt and nickel, said metals being in the form of their sulfides and said catalyst having an average pore radius of at least 25 angstrom units and a compacted bulk density of about 0.3–0.8 gram per cc. provide advantages in the hydrodesulfurization of petroleum residuum.

5 Claims, No Drawings

HYDRODESULFURIZATION OF PETROLEUM RESIDUUM UTILIZING A CARBON-SUPPORTED CATALYST

CROSS REFERENCE TO RELATED APPLICATIONS

This application is a division of application Ser. No. 540,936 filed Jan. 14, 1975, now U.S. Pat. No. 3,997,473, which in turn, is a continuation-in-part of application Ser. No. 408,356 filed Oct. 23, 1973 now abandoned.

This invention relates to a process for hydrodesulfurization of petroleum residuum, to a catalyst composition useful in such process, and to a method of preparation of said catalyst composition. More particularly, the invention relates to such a process employing a catalyst composition consisting essentially of a carbon support carrying at least two selected metals in the form of their sulfides, said catalyst composition having certain specified physical properties so as to have an average pore radius above a specified minimum value.

A petroleum residuum is the residue obtained after removal of distillates from crude feedstocks. The residuum contains components of large molecular size and weight and is generally characterized by three specific ingredients: (1) asphaltenes and other high molecular weight aromatic structures which inhibit the rate of hydrodesulfurization and cause catalyst deactivation; (2) metal contaminants derived from prior catalytic treatment of the crude, which contaminants deactivate hydrodesulfurization catalysts and interfere with catalyst regeneration; and (3) a relatively large content of sulfur compounds which give rise to objectionable quantities of $SO_2$ and $SP_3$ upon combustion of the petroleum residuum.

The present market for residual fuel oil is about 2,203,000 barrels/day and is expected to increase to about 3,070,000 barrels/day in 1975. About three-fourths of the residual fuel oil is used in the United States, mainly on the east coast. Recent pollution control legislation limits the amount of sulfur in residual oils, generally to about 0.3 weight percent sulfur. Untreated residual oils, however may contain as much as about 5 weight percent sulfur. Accordingly, extensive sulfur removal is required and an economic method of sulfur removal from residual fuels is now of great importance.

Hydrodesulfurization has been recongnized as a potential means for removing sulfur from petroleum residuum. In addition to sulfur removal, hydrodesulfurization processes generally result in added benefits by virtue of nitrogen removal and removal of metal contaminants. In spite of these benefits, the commerical application of hydrodesulfurization to residuum to provide improved fuels has been minimal. Prior processes which have been most successful have employed molybdenum or tungsten in combination with nickel or cobalt on an alumina support. Low economic incentives for improved residual fuels, high operating costs associated with high operating pressures required, high hydrogen consumption, short effective catalyst life, inability to regenerate catalyst activity, and the lack of practical procedures to recover valuable catalyst metal contents have combined to discourage the application of hydrodesulfurization to petroleum residuum.

In the use of catalyst compositions based on alumina supports in the hydrodesulfurization of petroleum residuum, numerous difficulties arise. The alumina support is structured so as to possess the physical properties necessary for effective use. Such structuring requires special processing which adds to the costs of the catalyst. High levels of catalyst materials must be carried by the alumina support in order to obtain adequate performance. The alumina supports are readily contaminated by the asphaltenes and metal contaminants present in the residuum and readily lose their effectiveness in hydrodesulfurization. The inactivated catalysts cannot be effectively regenerated in a practical manner because of the tenaciousadsorption of the asphaltenes and metal contaminants and are generaly discarded after a single use. Recovery of the valuable catalyst materials is difficult to effect because of the nature of the alumina support with the result that hydrodesulfurization of petroleum residuum employing alumina-supported catalysts is unattractive and recourse must be had to other means.

In U.S. Pat. No. 3,725,303, issued April 3, 1973 to Urban et al., there is disclosed a catalyst composition based on a carbon support. The support carries a limited quantity of molybdenum sulfide and cobalt sulfide which are separately applied in any order and separately sulfided. The catalyst is useful for reducing in aqueous solution oxysulfur compounds formed by combustion of sulfur-containing fuels or by adsorption and oxidation of hydrogen sulfide. The aqueous solutions arise as major products or by-products of industrial activities. The process requires that the oxysulfur compounds be water-soluble and in the form of a sulfate, sulfite, or thiosulfate. The process is not applicable to direct treatment of petroleum residuum because the sulfur compounds therein are not water-soluble and are not normally associated with oxygen in the manner required. The process of the reference, therefore, does not provide a method for minimizing oxides of sulfur which arise upon combustion of residual fuel oils, but, conversely, requires that such oxides be formed in order for its utility to be realized.

In accordance with the present invention, there is provided a process for the hydrodesulfurization of petroleum residuum comprising contacting said residuum at elevated temperature and pressure with hydrogen in the presence of a catalyst composition consisting essentially of a carbon support carrying at least 10 and up to about 20 weight percent of a first metal selected from tunsten and molybdenum and from about 2 to 10 weight percent of a second metal selected from cobalt and nickel, said percentages being expressed as the metal oxide contents based on the weight of said support and said metals being substantially in the form of their sulfides, said catalyst composition having a surface area in the range of about 200–800 square meters per gram, a pore valume of about 0.25 to 1.3 cubic centimeters per gram so as to have an average pore radius of at least about 25 angstrom units, and a compacted bulk density in the range of about 0.3 to 0.8 gram per cubic centimeter.

In accordance with the present invention, there is also provided a hydrodesulfurization catalyst composition for treating a petroleum residuum which composition consists essentially of a carbon support carrying thereon at least 10 and up to 20 weight precent of a first metal selected from tungsten and molybdenum and from about 2 to 10 weight percent of a second metal selected from cobalt and nickel, said percentages being expressed as the metal oxide contents based on the weight of said support and said metals being substantially in the form of their sulfides, said catalyst composition having a surface area in the range of about 200–800 square meters per gram, a pore volume of about 0.25 to 1.3 cubic centimeters per gram so as to have an average pore radius of at least 25 angstrom units, and a compacted bulk density in the range of about 0.3 to 0.8 gram per cubic centimeter.

In addition, in accordance with the present invention, there is provided a process for preparing a hydrodesulfurization catalyst useful in treating petroleum residuum which process comprises: (1) selecting a porous carbon support which has a surface area in the range of about 200 to 800 square meters per gram, a pore volume of about 0.25 to 1.3 cubic centimeters per gram so as to have an average pore radius of at least 25 angstrom units, and a compacted bulk density of about 0.3 to 0.8 gram per cubic centimeter; (2) impregnating said support with sufficient of an aqueous solution of a compound of a first metal selected from tungsten and molybdenum so as to deposit at least 10 and up to about 20 weight precent of said first metal thereon and with sufficient of an aqueous solution of a compound of a second metal selected from cobalt and nickel so as to deposit from about 2 to 10 weight percent of said second metal thereon, said percentages being expressed as the metal oxide contents based on the weight of said support and said metal compounds being convertible to their sulfides, said impregnating being carried out in at least one step with at least some of said first metal compound being present in a first impregnating step when more than one impregnating step is employed; (3) drying the impregnated support at a temperature below about 350° C.; and (4) sulfiding the dried composition prior to use.

The present invention provides a hydrodesulfurization process for a petroleum residuum employing a catalyst composition simply using carbons readily available in the range of physical properties required and, thus, no special structuring procedure is required. The catalyst composition can be economically taken out of service after a short period of use because of the simple preparative method, and consequently, no regeneration is necessary. Catalytic metal values are readily recoverable from the spent catalyst by burning off the carbon support. The process of hydrodesulfurization of the present invention provides a high degree of sulfur removal from the petroleum residuum without destruction thereof.

In carrying out the present invention, a catalyst composition is used which consists essentially of a carbon support of specific physical characteristics carrying thereon specified amounts of a first metal and specified amounts of a second metal the metals being in the form of their sulfieds. Physical properties of support materials used to carry catalyst materials may be defined in a number of ways, such as by diffusivity or pore size distribution data. Diffusivity data suffers from considerable uncertainties and is not acceptable to many artisans in the catalyst field. Pore size distribution curves are difficult to interpret quantitatively when no particularly sharp distributions are encountered. Therefore in the present application catalyst support properties are defined in terms of average pore radius.

The average pore radius is based upon the relationship between surface area and pore volume, assuming cylindrical pores (a valid assumption in the absence of definitive pore-shape data). The average pore radius, $\bar{r}$, is defined as twice the pore volume, 2PV, divided by the BET surface area, $SA_{BET}$, and multiplied by $10^4$. This is expressed in the equation $\bar{r} = 2PV/SA_{BET} \times 10^4$, wherein pore volume is in cubic centimeters per gram, surface area is determined by nitrogen sorption and is in square meters per gram and the average pore radius is expressed in angstrom units. The primary consideration in selecting a useful carbon support for purposes of the present invention, therefore, is the average pore radius, which must be at last about 25 angstrom units. Since the average pore radius is determined from the relationship between pore volume and surface area, it is necessary to know these values. Another consideration in selecting a useful carbon support for purposes of the present invention is its compacted bulk density which must be about 0.3–0.8 gram per cubic centimeter. The methods of determining the necessary values are next given.

PORE VOLUME

For purposes of this invention, it is convenient to measure pore volume utilizing water absorption, which gives results which are reproducible to about ±10% and is readily performed. The method is as follows:

1. Into an evaporating dish, weight out a suitable amount, generally 1–2 grams, of the carbon support.
2. Add water slowly while mixing with a spatula. When water is no longer absorbed by the solid, carefully blot and remove excess water from the dish.
3. Reweigh the material.
4. Calculate the pore volume, assuming the absorbed water occupies the pore volume and 1 gram of water occupies 1 cubic centimeter.

SURFACE AREA

The surface area is determined by a low temperature nitrogen adsorption technique which was first reported by Brunauer, Emmet and Teller, J. Amer. Chem. Soc. 60, 309 (1938) and is thus referred to as the BET surface area. Modifications of the procedure are reported in Anal. Chem. 30, 1387 (1958) and 34, 1150 (1962).

COMPACTED BULK DENSITY

Compacted bulk density is determined by carefully pouring the sample into a weighed graduated cylinder while vibrating the cylinder to compact the solid. The cylinder is reweighed, the volume of the cylinder read, and the CBD expressed as the weight in grams of a cubic centimeter of compacted solid.

In selecting a carbon support for purposes of the present invention, it is generally suitable to select one that has an average pore radius eradius as calculated from surface area and pore volume values of at least 25 angstrom units and a bulk density in the range of about 0.3 to 0.8 gram per cubic centimeter. The necessary value of average pore radius can be found among carbon supports that have the proper combination of pore volume in the range of about 0.25–1.3 cc./g. and surface area in the range of about 200–800 m²./g. For example, a support having a pore volume of 0.25 cc./g. and a surface area of 200 m²./g. will have an average pore radius of 25 angstrom units and a support having a pore volume of 1.2 cc./g. and a surface area of 800 m²./g. will have an average pore radius of 30 angstrom units. Other examples within the range of pore volumes and surface areas are as follows:

| If SA$_{BET}$ is: | 300 | 300 | 600 | 600 |
| --- | --- | --- | --- | --- |
| And PV is: | 0.8 | 1.2 | 0.8 | 1.2 |
| Average Pore Radius, $\bar{r}$, is: | 53 | 80 | 27 | 40 |

The values given above are those associated with the carbon support. Some reduction in values of surface area and pore volume is generally associated with impregnation of the support with metal compounds, but the actual pore radius of the final catalyst composition generally remains essentially constant.

In selecting carbon supports for purposes of the present invention, it is to be noted that only some of the commercially available carbon particulates meet the requirements as to average pore radius and compacted bulk density. It is also to be noted that the limitation as to an average pore radius of at least 25 angstrom units does not preclude some pores of smaller radii. The limitation merely designates that the summation of all pores with respect to both number and size will result in an average pore radius of at least 25 angstrom units. Thus, the limitation excludes carbons which contain a major portion of small pores and an insufficient number of large pores to provide the necessary average pore radius. It also excludes carbons which have porosity such that the compacted bulk density is outside the specified limits of 0.3–0.8 gram per cubic centimeter.

The limitation as to the compacted bulk density of the selected carbon support, as has been indicated, is that it be in the range of about 0.3 to 0.8 gram per cubic centimeter. At values above about 0.8 g/cc., it is generally not possible to obtain the necessary combination of pore volume and surface area to provide an average pore radius of at least 25 angstrom units. At values below about 0.3 g./cc., the amount of the resulting catalyst that can be packed in a unit reactor volume on a weight basis will generally be too low to provide efficient reaction rates.

Once a suitable carbon support has been selected as specified above, it is next treated with catalytic metal compounds to provide the necessary metal loadings. Two different metal types are necessary, a first metal type which may be considered as the support activator for the hydrodesulfurization reaction contemplated and a second metal type which may be considered as a promoter used in conjunction with the activator. Metals suitable to be used as activators include tungsten and molybdenum. Metals suitable to be used as promoters include cobalt and nickel. The activator metal will be present in an amount of at least 10 and up to about 20 weight percent expressed as the metal oxide based on the weight of the catalyst support.

In treating the support to provide the metal contents thereon, any suitable treating procedure may be employed. A preferred procedure involves employing pore saturating techniques. In such procedures, suitable metal compounds in aqueous solution are employed. The amount of solution employed is about that necessary to saturate the support pores and the amount of metal compounds to be employed is dissolved in an aqueous medium. Preferred metal compounds in such procedures are ammonium heptamolybdate [(NH$_4$)$_6$MO$_7$O$_{24}$·4H$_2$O] and cobalt nitrate [CO(NO$_3$)$_2$·6H$_2$O]. Other useful compounds include nickel nitrate, chlorides and sulfates of cobalt and nickel, molybenum trioxide (MoO$_3$), ammonium molybdate [(NH$_4$)$_2$MoO$_4$], tungstic acid (WO$_3$), and ammonium metatungstate [(NH$_4$)$_2$W$_4$C$_{13}$·8H$_2$]. The useful metal compound is one which will be converted substantially to the metal sulfide upon subsequent sulfiding of the catalyst prior to use.

In impregnating the carbon support with the metal compounds dissolved in aqueous medium, several variants are possible, In a first variant, a single impregnation step is employed using an aqueous solutin of suitable compounds of both metals in the required amounts. In such case, the two metal compounds should be compatible in solution for a time period sufficient to effect impregnation. In a second variant, two impregnation steps are employed applying first the activator in separate aqueous solution and subsequently applying the promoter in separate aqueous solution, with drying at a temperature below about 350° C. between applications. In this variant the problem of compatibilty of the metal compounds is avoided but it is essential that the activator be impregnated first if adequate catalyst activity is to be obtained. In a third variant, two or more impregnating steps are employed, using an aqueous solution of both activator and promoter compounds in less than the total amounts required for full metal loading in the separate impregnation steps. It is necessary that at least some of the activator metal compound be present in the first impregnating step to achieve adequate catalyst activity. This variant will reduce solubility requirements of individual compounds and will ease compatibility problems that develop at high concentrations of mixed compounds. Again, where multiple impregnations are employed, drying at a temperature below about 350° C. is employed between impregnation. After impregnation of the support with the metal compounds is complete, it is dried at a temperature below about 350° C. so that a drying operation follows each impregnation step, regardless of the number employed. Drying at a temperature below about 350° C. is necessary to prevent combustion of the carbon.

After the catalyst has been impregnated and dried as indicated, it is subjected to sulfiding prior to use in the hydrodesulfurization reaction. The sulfiding may be carried out in any convenient manner according to conventional procedures. However, it is generaly preferred to carry out sulfiding in the same reactor to be used in the hydrodesulfurization reaction in a preliminary run. It is to be noted that sulfiding is carried out after complete impregnation with metal contents is effected, i.e. no intermediate sulfiding is required. Hydrogen sulfide is conveniently employed as the sulfiding agent, generally in admixture with hydrogen in which about 10 volume percent of H$_2$S is present with about 90 volume percent of hydrogen. Sulfiding is in accordance with standard procedures using an excess over stoichiometric of H$_2$S so as to obtain the metals substantially in the form of their sulfides.

Hydrodesulfurization of a petroleum residuum is carried out by contacting the residuum at elevated temperature and pressure with hydrogen in the presence of a catalyst composition of the present invention. In accordance with the present invention, hydrodesulfurization of a petroleum residuum is carried out in accordance with conventional procedures except for the provision of the catalyst composition of the present invention in place of the conventional catalyst. In carrying out the conventional hydrodesulfurization process, a petroleum residuum is generally contacted with the catalyst particles in the presence of hydrogen gas at specified values of temperature, pressure, and space velocity. The catalyst particles are usually present in the form of a fixed bed and generally several beds are employed. The hydrogen gas and residuum are mixed and fed downward through the catalyst bed. Catalyst bed size and residuum flow rate are adjusted so as to provide a liquid hourly space velocity in the range of about 0.20 to 5.0. Hydrogen flow rate is from about 500 to 5000 standard cubic feet per barrel of residuum. The reaction temperature is in the range of about 600° to about 850° F. and the total pressure is from about 500 to 10,000 pounds per square inch gauge. Elaborate equipment is required to carry out hydrodesulfurization of petroleum residuum and, generally, such equipment is found only in refineries that process petroleum residuum.

It has been found that the effectiveness of a hydrodesulfurization catalyst for petroleum residuum can be readily ascertained by use of a stirred reactor in which the petroleum residuum and catalyst particles are present and said reactor is maintained at elevated temperature under hydrogen pressure. From the sulfur removal values obtained with a standard catalyst under a given set of conditions in the stirred reactor, a standard activity is calculated. The sulfur removal value of a test catalyst sample obtained under the same operating conditions is then compared to the standard value and a relative activity value assigned. The relative activity value obtained correlates well with the activity values obtained on commerical petroleum residuum processing equipment under the conventional operating conditions.

Catalysts of the present invention provide improved activity in hydrodesulfurization of petroleum products compared to prior carbon supported catalysts having the same activators and promoters in identical amounts. Although a catalyst of the present invention is not as active as a commercial hydrodesulfurization catalyst based on an alumina support, its activity is adequate and the carbon supported catalyst of the present invention provides advantages over the alumina supported catalysts as previously discussed.

The invention is more fully illustrated by the examples which follow wherein all parts and percentages are by weight unless otherwise specified.

In order to illustrate the present invention properly, there are presented examples involving hydrodesulfurization of three different sulfur-contaning materials. The first material involved is thiophene and is used to indicate intrinsic activity of the catalysts since it is a relatively small molecule and readily penetrates catalyst porosity. Thus, test results obtained with thiophene indicate activity of catalysts in hydrodesulfurization absent any problem of diffusion of the reactant molecules into the pores of the catalyst.

The second material involved is gas oil and is used as an indication of the effect of increased molecular size of reactants on hydrodesulfurization activity of the catalysts employed. Thus, although the molecular size of gas oil is larger than that of thiophene, it is not as large as that of residuum. Residuum also contains metal contaminants and asphaltenes which complicate hydrodesulfurization processing.

The third material involved is petroleum residuum and provides direct data as to the present invention. Because of the complications introduced by the asphaltenes and metal contaminants in hydrodesulfurization reactions involving residuum, therefore, intrinsic activity of the hydrodesulfurization catalysts is first established by use of thiophene, next the effect of molecular size on catalyst activity is indicated by use of gas oil, and finally the invention is more fully illustrated using residuum. Thus, all the features of the present invention become clear by avoiding the complications of the asphaltenes and metal contaminants where possible.

In the examples which follow, two commerical sources of carbon particles are employed as supports in preparing catalysts. One of these carbons, designated as Carbon No. 1, has physical properties that enable catalyst compositions of the present invention to be provided. The other carbon, designated as Carbon No. 2, does not have suitable physical properties that enable catalyst compositions of the present invention to be provided. Identification and physical properties of these two carbon supports are given in Table I, which follows.

TABLE I

| PHYSICAL PROPERTIES OF COMMERCIAL CARBONS | | |
|---|---|---|
|  | CARBON NO. 1 | CARBON NO. 2 |
| Surface Area, BET, Meters$^2$ Per Gram | 583 | 1235 |
| Water Pore Volume Centimeters$^3$ Per Gram | 1.3 | 1.2 |
| Average Pore Radius Angstrom Units | 45 | 19 |
| Compacted Bulk Density Gram Per Centimeter$^3$ | 0.42 | 0.43 |
| Particle Size Mesh Passes Through X Retained By | 12 X 20 | 10 X 20 |

THIOPHENE PROCESSING

These examples are designated by letters to distinguish them from examples involving gas oil or residuum.

EXAMPLE A

In this example Carbon No. 1 was employed as the support. A catalyst composition was prepared by impregnating as follows.

In 9.0 milliliters (ml.) of water was dissolved 1.83 grams (g.) $(NH_4)_6 MO_7 O_{24}.4H_2O$ and 1.16 g. $CO(NO_3)_2.6H_2O$. The resulting solution was poured onto 8.2 g. of the carbon particles and mixing was effected to uniformly wet and impregnate the carbon. The impregnated carbon was dried at 110° C.

EXAMPLE B

Carbon No. 1 was again employed and impregnation was as follows.

In 9.0 ml. of water was dissolved 1.83 g. $(NH_4)_6 MO_7O_{24}.4H_2$. The resulting solution was poured onto 8.2 g. of the carbon particles and mixing was effected to uniformly wet and impregnate the carbon. The impregnated carbon was dried at 110° C. and heated in air at 250° C. ± 10° C. for 30 minutes In 9.0 ml. of water was dissolved 1.16 g. $Co(NO_3)_2 6H_2O$. The resulting solution was poured onto the cooled. dried particles obtained above and mixing was effected to uniformly wet and impregnate the carbon. The thus-impregnated carbon was dried at 110° C.

EXAMPLE C

The procedure of Example B was followed in every material detail except the solution of cobalt nitrate was impregnated first and subsequently the solution of ammonium heptamolybdate was impregnated.

EXAMPLE D

Carbon No. 1 was again employed and impregnation was as follows.

In 9.0 ml. water was dissolved 0.915 g. $(NH_4)_6Mo_7O_{24}\cdot 4H_2O$ and 0.58 g. $Co(No_3)_2\cdot 6H_2O$. The resulting solution was poured onto 8.2 g. of carbon particles and mixing was effected to uniformly wet and impregnate the carbon. The impregnated carbon was dried at 110° C. and heated in air at 250° C. ± 10° C. for 30 minutes.

A solution of the same composition was again prepared in the same amount and poured onto the previously impregnated carbon. After mixing to uniformly wet and impregnate the carbon, the thus-impregnated carbon was then dried at 110° C.

EXAMPLE E

The procedure of Example A was followed in every material detail except that prior to drying, the impregnated carbon was subjected to $H_2S$ gas in an amount which was 2-'times the stoichiometric requirements to convert the metals present to the sulfides. The sulfided catalyst was then dried at 110° C.

EXAMPLE F

The procedure of Example A was followed in every material detail except that the carbon support employed was Carbon No. 2.

EXAMPLE G

The procedure of Example E was followed in every material detail except that the carbon support employed was Carbon No. 2.

EXAMPLE H

In this example, a standard commerical hydrodesulfurization catalyst was prepared according to conventional procedures using an alumina support.

A spray-dried precipitated alumina was mixed with water in a muller to provide an extrusion mix. Into the mix was added sufficient $(NH_4)_6MO_7O_{24}\cdot 4H_2O$ and $co(NO_3)_2\cdot 6H_2O$ to provide the equivalent of 15% $MoO_3$ and 3% CoO on the final catalyst. The mix was then extruded and the extrudates dried and calcined in accordance with conventional procedure.

EXAMPLE I

In this example, the procedure of Example H was repeated in every material detail except that the activator and promoter was omitted from the extrusion mix.

After the extrudates was dried and calcined, they was impregnated with an aqueous solution containing sufficient $(NH_4)_6Mo_7O_{24}\cdot 4H_2O$ and $Co(NO_3)_2\cdot 6H_2O$ to provide the equivalent of 15% $MoO_3$ and 3% CoO on the final catalyst. After impregnation the catalyst was again dried and calcined in accordance with conventional procedure.

EXAMPLE J

In this example, the procedure of Example H was again repeated in every material detail except that the activator and promoter were omitted from the extrusion mix.

After the extrudates were dried and calcined, they were impregnated with an aqueous solution containing sufficient $(NH_4)_6Mo_7O_{24}\cdot 4H_2O$ to provide the equivalent of 15% $MoO_3$ on the final catalyst and again dried and clacined in conventional manner.

in a subsequent impregnation, an aqueous solution containing sufficient $CO(NO_3)_2\cdot 6H_2O$ to provide the equivalent of 3% CoO on the final catalyst was employed. After this second impregnation the catalyst was again dried and calcined according to conventional procedures.

EXAMPLE K

In this example the carbon support employed was Carbon No. 2.

In 70 ml. water was dissolved 17.43 g. $(NH_4)_2Cr_2O_7$. The resulting solution was poured onto 59.5 g. of the carbon particulates and mixing was effected to uniformly wet and impregnate the carbon. The impregnated carbon was dried at 110° C.

EVALUATION FOR THIOPHENE ACTIVITY

In carrying out the test, a mixture of hydrogen and thiophene is passed through a fixed catalyst bed held at various temperatures within a furnace. The product gas is analyzed for thiophene and compared to the feed composition. A first order rate constant is then calculated, knowing the catalyst weight and feed rate of gas to bed, and this rate constant is compared to that of a standard catalyst to obtain relative numbers. In practice, values are obtained at three or four temperatures and these are averaged to obtain the final value reported.

In carrying out the test, all catalysts were subjected to a standard pre-sulfiding in a mixture of $H_2$—$H_2S$ before activity values were determined. Where the catalyst has been pre-sulfided in conjunction with impregnation, the subsequent pre-sulfiding will have negligible effect. Thiophene, liquid at room temperature, was entrained in the hydrogen flow by means of a saturator held at 0° C. to provide about 2% thiophene in the reactant stream.

The testing apparatus held four catalyst tubes within the same furnace and connected to the same feed line. In every run, one of the tubes contained the standard catalyst so that comparisons between different runs could be made.

In carrying out the tests, the following procedure was followed.

1. The catalysts were purged with 10% $H_2S$ and 90% $H_2$ mixture and then heated to 400° C.
2. The system was held at 400° C. for 1 hour with the $H_2S$—$H_2$ mixture flowing and then allowed to cool.
3. When the temperature dropped to 250° C. the $H_2S$—$_2$ flow was stopped and the thiophene-$H_2$ flow was begun.
4. The temperature was allowed to stabilize at about 180° C. After about 30 minutes, samples of the products and reactant gases were taken and flow rates through the tubes measured.
5. The temperature was increased to 200° C. and step 4 was repeated. The temperature was then increased to 215° C. and step 4 was again repeated. Finally, the temperature was increased to 230° C. and step 4 again repeated.

Results of the tests are given in Table II.

The following conclusions are evident from Table II.

1. A one-step impregnation of the equivalent of 3 % CoO and 15% $MoO_3$ on Carbon No. 1 without presulfiding in conjunction with impregnation provides a catalyst equivalent to the standard alumina catalyst, compare results of Examples A and H.

2. A two-step impregnation of similar metal contents on Carbon No. 1 in which at least some molybdenum is present in the first step gives improved activity over the one-step impregnation, compare results of Examples A, B, and D.

3. A two-step impregnation of similar metal contents on Carbon No. 1 in which no molybdenum is present in the first step gived decreased activity over the one-step impregnation, compare results of Examples A and C.

4. Use of sulfiding in conjunction with one step impregnation improves the activity of catalysts prepared with Carbon No. 2 but decreases the activity of catalyst prepared with Carbon No. 1, compare the results of Examples A/E and F/G. This is a surprising result and the catalysts thus prepared are essentially equivalent in thiophene desulfurization activity.

5. Although subsequent one-step impregnation of alumina supports increases activity over extrusion mix incorporation, two-step impregnation employing molybdenum first provides no advantage, compare the results of Examples H, I, and J. Compared with the results of Examples H, I, and J, the results of Examples A, B, and D are surprising.

6. The use of chromium in palec of molybdenum/cobalt on Carbon No. 2 results in decreased activity, compare the results of Examples F and K.

EXAMPLE I

A catalyst was prepared following the procedure of Example G.

The catalyst obtained had the following physical properties:

| | |
|---|---|
| Surface Area BET $M.^2/G.$ | 830 |
| Water Pore Volume CC/G | 0.7 |
| Average Pore Radius Angstrom Units | 17 |
| Compacted Bulk Density G/CC | 0.57 |

EVALUATION FOR GAS OIL ACTIVITY

The catalysts of Examples I and II were evaluated for their activity in removing sulfur from a gas oil petroleum fraction in a fixed bed reactor in accordance with conventional procedures. The catalyst of Example I was presulfided in the reactor by standard procedures using 10% $H_2S$—90% at 700° F. and atmospheric pressure for 2 hours. The catalyst of Example II was sulfided in conjunction with its preparation and required no presulfiding. Gas oil and hydrogen were passed through the test beds and after several hours to attain equilibrium, a liquid product sample was taken for

TABLE II
THIOPHENE HYDRODESULFURIZATION WITH VARIOUS CATALYSTS

| CATALYST OF EXAMPLE | SUPPORT | DESCRIPTION METAL EQUIVALENTS | IMPREGNATION | PRESULFIDED | RELATIVE ACTIVITY AVERAGE 4 TEMPERATURES |
|---|---|---|---|---|---|
| A | Carbon No. 1 | 3% CoO + 15% $MoO_3$ | 1 Step | No | 100 |
| B | Carbon No. 1 | 3% CoO + 15% $MoO_3$ | 2 Step, $MoO_3$ First | No | 143 |
| C | Carbon No. 1 | 3% CoO + 15% $MoO_3$ | 2 Step, CoO First | No | 93 |
| D | Carbon No. 1 | 3% CoO + 15% $MoO_3$ | 2 Step, 50% Both Metals In Each Step | No | 110 |
| E | Carbon No. 1 | 3% CoO + 15% $MoO_3$ | 1 Step | Yes | 90 |
| F | Carbon No. 2 | 3% CoO + 15% $MoO_3$ | 1 Step | No | 64 |
| G | Carbon No. 2 | 3% CoO + 15% $MoO_3$ | 1 Step | Yes | 93 |
| H | Alumina | 3% CoO + 15% $MoO_3$ | In Extrusion Mix | No | 100 |
| I | Alumina | 3% CoO + 15% $MoO_3$ | 1 Step | No | 108 |
| J | Alumina | 3% CoO + 15% $MoO_3$ | 2 Step, $MoO_3$ First | No | 107 |
| K | Carbon No. 2 | 15% $Cr_2O_3$ | 1 Step | No | 30 |

GAS OIL PROCESSING

These examples are designated by Roman numerals to distinguish them for examples involving thiophene or residuum.

EXAMPLE I

A catalyst was prepared following the procedure of Example A.

The Catalyst obtained had the following physical properties:

| | |
|---|---|
| Surface Area BET $M^2/G.$ | 380 |
| Water Pore Volume CC/G | 0.9 |
| Average Pore Radius Angstrom Units | 47 |
| Compacted Bulk Density G./CC. | 0.59 | analysis. Test conditions were as follows:

| GAS OIL TEST CONDITIONS | |
|---|---|
| Pressure | 750 psig |
| Temperature | 650 and 725° F. |
| Liquid Hour Space Velocity | 2 |
| Liquid Feed | 100 cc./hr. |
| $H_2$ Feed | 3.7 SCF/hr. |
| Catalyst Volume | 50 cc. |

The gas oil feedstock had the following properties:

| GAS OIL PROPERTIES | |
|---|---|
| A.P.I. Gravity | 23.3 |
| Boiling Range | 490–725° F. |
| Sulfur | 1.0% |
| Basic N | 515 ppm. |

Separate runs were made with each catalyst at the two operating temperatures. Rate constants were calculated from the sulfur removal data. A standard activity of 100 was arbitrarly assigned to the catalyst of Example II and the relative activity of the catalyst of Example I expressed in terms of the standard. The standard commercial alumina-support catalyst of Example H of the thiophene series removed 97.2% while catalyst of Example I of this series removed 96.2% of the sulfur present, thus indicating a high order of sulfur removal for carbon-supported catalyst. Results of the Gas oil Tests are given in Table III.

TABLE III

| | GAS OIL HYDRODESULFURIZATION | | |
|---|---|---|---|
| Catalyst of Example | Thiophene Activity | Gas Oil Relative Activity 650° F. | 725° F. |
| I | 90 | 141 | 375 |
| II | 93 | 100 | 100 |

The results given in Table III show that, although the two catalysts have comparable activity in hydrodesulfurization of thiophene where diffusion is no problem, vast differences in activity are shown in hydrodesulfurization of gas oil where larger sulfur-bearing molecules are involved. The results show that the activity of the catalyst of Example I, the carbon of larger average pore radius, is far superior at both temperatures to that of the catalyst of Example II, the carbon of lower average pore radius.

RESIDUUM PROCESSING

These examples are designated by arabic numbers to distinguish them from examples involving thiophene or gas oil.

EXAMPLE 1

A catalyst was prepared following the procedure of Example B. The catalyst obtained had physical properties identical to those of Example I.

EXAMPLE 2

A catalyst was prepared following the procedure of Example F. The catalyst obtained had physical properties identical to those of Example II.

EVALUATION FOR RESIDUUM ACTIVITY

The residuum employed is designated as Kuwait Atmospheric Tower Bottoms and is the heavy oil left in the still when a Kuwait crude is distilled at atmospheric pressure. The boiling rang of the residuum is 650°–1100° F. and it contains 3.6% sulfur.

In testing, a magnetically stirred stainless steel bomb having inlet and outlet lines for hydrogen gas, was employed as the reactor. The bomb was charged with 200 grams of residuum and 15 grams of the catalyst under test. The procedure was as follows:

1. Oil and test catalyst were charged to the reactor and the reactor was sealed.
2. Temperature was raised to 325° C. with hydrogen pressure at 50 psig.
3. When temperature reached 325° C. stirring speed was adjusted to 1000 rpm and the hydrogen pressure was raised to 500 psig. The test was considered to initiate at this point.
4. Over a 2 hour period, the temperature was maintained at 325° C., the hydrogen pressure at 500 psig, and the stirring speed at 1000 rpm. Hydrogen flow was maintained and $H_2S$ produced from the reaction was collected in a scrubber containing aqueous NaOH solution.
5. After 2 hours, the heating mantle surrounding the reactor was quickly dropped and this acted as a quench ending the reaction.
6. Sulfur analyses on the product oil as well as on the caustic scrubbing solution were used to calculate sulfur removal. The activity obtained with the catalyst of Example 2 was arbitrarily assigned a value of 100 and the activity of the catalyst of Example 1 reported as relative thereto. Results are given in Table IV.

TABLE IV

| RESIDUUM HYDRODESULFURIZATION | |
|---|---|
| CATALYST OF EXAMPLE | RELATIVE ACTIVITY |
| 1 | 220 |
| 2 | 100 |

The results given in Table IV show that the carbon supported catalyst of the present invention, having an average pore radius in excess of 25 angstrom units, is vastly superior in the hydrodesulfurization of a residuum than is a carbon-supported catalyst having an average pore radius below 25 angstrom units.

On a weight basis, a carbon-supported catalyst of the present invention is not as effective in sulfur removal involving residuum as is an alumina-supported catalyst of the same metal loadings, but does provide a significant level of sulfur removal. However, because of the lower cost of the carbon supported catalyst and the ready recovery of metal values therefrom, high usages of carbon-supported catalysts can provide at least equivalent sulfur removal with advantages in metal recovery. To illustrate metal recovery, the following exaple is provided.

EXAMPLE 3

After completion of the residuum hydrodesulfurization test described above, the reactor content is filtered to separate the carbon-supported catalyst from the residuum oil. The recovered catalyst is then placed on a combustion boat and subjected to combustion in the presence of oxygen. When combustion is complete the residue on the combustion boat is essentially a mixture of $MoO_3$ and CoO. The residue is first treated with concentrated aqueous $NH_4OH$ to dissolve the $MoO_3$ and form ammonium molybdate and then treated with nitric acid to dissolve the CoO and from cobalt nitrate. In this way substantially complete recovery of the metal values can be obtained for use in providing additional catalyst.

When an alumina-supported catalyst is employed, the catalyst would agan be separated from the residual oil by filtration. However, since alumina is not combustible, a more tedious separation procedure for metal values is necessary. Because the atalyst is used in relatively coarse particulate size, it would first be necessary to comminute the particles to fine size. Next, it would be necessary to subject the comminuted particles to extensive leaching in efforts to obtain first the one and then the other of the metal values because of the different natures of leaching agents required. In addition, because of the tenacious association of the metal values with the alumina support, leaching is only effective to limited extent based on experience and, as a result, significant portions of the metal values are not recovered. Consequently, because of the processing required and the limited success achieved by such processing, efforts to recover metal values from spent alumina suported hydrodesulfurization catalysts used in treating residua are not practical in spite of the fact that such catalysts are inactivated and not capable of regeneration after a single use.

We claim:

1. A process for the hydrodesulfurization of petroleum residuum comprising contacting said residuum at elevated temperature and pressure with hydrogen in the presence of a catalyst composition consisting essentially of a carbon support carrying at least 10 and up to about 20 weight percent of a first metal selected from tungsten and molybdenum and from about 2 to 10 weight percent of a second metal selected from cobalt and nickel, said percentages being expressed as the metal oxide contents based on the weight of said support and said metals being substantially in the form of their sulfides, said catalyst composition having a surface area in the range of about 200–800 square meters per gram, a pore volume of about 0.25 to 1.3 cubic centimeters per gram so as to base an average pore radius of at least about 25 angstrom units, and a compacted bulk density in the range of about 0.3 to 0.8 gram per cubic centimeter.

2. The process of claim 1 wherein said elevated temperature is in the range of about 600° to 850° F.

3. The process of claim 1 wherein said pressure is from about 500 to 10,000 pounds per square inch gauge.

4. The process of claim 1 wherein said contacting is carried out at a liquid hourly space velocity in the range of about 0.20 to 5.0

5. The process of claim 1 wherein said hydrogen is at a flow rate of about 500 to 5,000 standard cubic feet per barrel of residumm.

\* \* \* \* \*